2,913,421

HYDRODESULFURIZATION CATALYST AND METHOD OF PREPARATION

William A. Horne and Charles W. Montgomery, Oakmont, Pa., assignors to Gulf Research & Development Company, Pittsburgh, Pa., a corporation of Delaware No Drawing. Application July 2, 1953
Serial No. 365,769

6 Claims. (Cl. 252—441)

This invention relates to improved catalytic compositions for use in the hydrodesulfurization of hydrocarbon oils. The improved catalysts show increased activity both with respect to hydrodesulfurization and destructive hydrogenation and in addition show improved stability upon repeated use.

It has been known to increase the hydrogenation activity of catalysts comprising alumina or high silica-low alumina carriers impregnated with a hydrogenating material such as a compound or compounds of iron group metals, zinc, titanium, zirconium, vanadium, chromium and tungsten. This increase in activity has been effected by treating the carrier, prior to impregnation with the hydrogenating compound, with corrosive fluorine compounds such as, for example, hydrofluoric acid. However, the effect of this treatment on desulfurizing activity of a desulfurizing catalyst has not received much attention. Even as practiced with hydrogenation catalysts this procedure has disadvantages. One serious disadvantage of this procedure is that the fluoride treated catalysts lose their added hydrogenation activity after the first cycle (one process period and one regeneration) or at least after the first few cycles. The reason for this lack of stability upon regeneration is not fully understood, but constitutes a serious disadvantage. The rapid loss of activity of the fluoride treated catalyst, along with other disadvantages, renders questionable the desirability of employing the pretreatment described, not only because the additional expense of the pretreating procedure may not be sufficiently balanced by the improvement in yields, but also because of the ultimate damage to the catalyst pellets.

Our own investigation into the problem has indicated a further disadvantage of the above described activating treatment, namely that the desulfurization activity of the catalyst is reduced by the said pretreatment. A high degree of sulfur removal is important in the production of fuels, since sulfur compounds lead to corrosion and poor odor qualities. In addition, as regards gasoline, high sulfur content may deleteriously affect engine performance.

One object of this invention is to provide hydrodesulfurization catalysts having increased activity. A further object is to provide desulfurizing catalysts which retain their desulfurizing activity after repeated use. Another object is to provide hydrodesulfurizing catalysts having superior desulfurizing and destructive hydrogenation activity. Other objects will appear hereinafter.

These and other objects are accomplished by our invention which involves improved hydrodesulfurization catalysts of increased desulfurizing activity, and procedure for preparing them by pretreating an alumina-silica catalyst carrier or support with a corrosive compound of fluorine. Said carrier must be one which is prepared by cogelation or coprecipitation of the alumina and silica forming components and one which comprises about 85 to 99 percent alumina with the balance being substantially all silica. After drying and/or calcining the so-treated carrier, a metalliferous hydrogenating catalyst is deposited thereon.

While certain preferred modifications of the invention are set forth in the following description, it is to be understood that these are by way of illustration only and are not to be considered as limiting.

The particular carriers to which this invention relates contain between about 85 to 99 percent alumina with the balance being substantially all silica. Carriers of the compositions 94 to 96 percent alumina and 6 to 4 percent silica are preferred. Although the carriers contemplated are preferably made up of alumina and silica only, other materials may be present in small amounts without harmfully affecting the results of the invention. The proportions of alumina and silica set forth above should not be varied substantially, since relatively pure alumina or silica-alumina mixtures containing appreciably higher percentages of silica show neither increased desulfurization activity nor increased retention of activity upon repeated regeneration, but on the contrary, show decreased activity and life. The catalyst supports of the invention are characterized by the fact that they show only X-ray diffraction lines of gamma alumina.

The alumina-silica carriers referred to must be prepared by coprecipitation or cogelation. These are well-known procedures. One such procedure involves simultaneous formation of an alumina and silica hydrogel by acidifying solutions containing alumina and silica forming components such as aqueous solutions of sodium silicate and sodium aluminate. The gel is usually washed, preferably with acid solution, to remove alkaline components. Another such procedure is the addition of a solution of sodium silicate to an aluminum salt solution such as a solution of aluminum nitrate, sulfate, or chloride followed by addition of ammonia. The product from such operations preferably is dried and broken or otherwise formed into pieces of a size suitable for use as a catalyst.

The so-prepared alumina-silica carrier is then treated with the corrosive compound of fluorine. A preferred treating procedure involves soaking the carrier with aqueous HF to produce a fluorine content of about 1 to 5 percent in the carrier. However, these limits may be varied. Although aqueous HF is the preferred fluorine compound, other corrosive compounds thereof may be used. Examples of these are gaseous HF, $NH_4F$, $NH_4F \cdot HF$, $H_2SiF_6$ and $HBF_4$. Usually aqueous HF solutions containing from about 2 percent to 10 percent HF are employed. The concentration will depend on the adsorptivity of the carrier and the objective is to incorporate fluorine in the carrier within the range of about 1 to 5 percent, as mentioned above. The treatment results in a net increase in weight of the carrier, apparently due to incorporation of fluorine. The fluorine treatment is normally carried out at room temperature, although lower or elevated temperatures may be utilized. A preferred treating procedure is to evacuate the carrier and then introduce the HF solution into the evacuated carrier. The vacuum is released and the carrier drained to remove excess liquid.

Following the treatment of the alumina-silica composition with aqueous HF or other corrosive fluorine compound, the pretreated carrier may be dried and/or calcined. Water washing after HF treatment is unnecessary and if employed should not be sufficient to remove the fluorine compound formed in the carrier. Drying at a temperature sufficient to rapidly remove water vapor, i.e. at above 212° F. is sufficient. However, we prefer to calcine the HF treated carrier, which operation may or may not include a preliminary drying step. Calcining gives additional beneficial effects. Calcining is carried out in the neighborhood of 800° to 1200° F. or higher.

Calcining may be carried out in the presence or absence of air, although the former is the more common procedure.

When the dried, but uncalcined, catalyst support is impregnated with a hydrogenating material and employed in the hydrodesulfurization of hydrocarbon oils, substantially increased activity is produced both with respect to desulfurizing action and with respect to destructive hydrogenating ability. The former is evidenced by lower sulfur content of the product and the latter by a product richer in the more valuable light hydrocarbons. However, even greater desulfurization or desulfurizing activity is produced when the carrier is calcined rather than merely oven dried prior to impregnation but after the fluoride treatment. In addition, the catalyst prepared by calcining exhibits a substantially greater degree of stability upon repeated use. For these reasons the modification of the invention involving calcining is preferred.

Following the oven-drying or calcining of the fluoride treated alumina-silica carrier, the carrier is impregnated with a metalliferous hydrogenating catalyst. This impregnation may be carried out by any conventional method, such as by treatment with a solution of a soluble salt of the hydrogenating metal and precipitation in situ followed by calcining, or, alternatively, by treatment with a solution of a soluble salt of the metal followed by calcining alone. If the metal itself is the desired catalyst, the oxide resulting from the calcining treatment may be reduced or partially reduced to the metallic state. If the sulfide is the desired catalyst the oxide resulting from the calcining step may be sulfided. While the amount of hydrogenating material deposited on the carrier may be varied over wide limits, about 5 to 15 percent of the hydrogenating catalyst by weight of the carrier is considered optimum. While any of the conventional materials conducive to hydrogenation are suitable for the purposes of this invention, iron, cobalt, nickel, their oxides, chromates, molybdates and tungstates or the corresponding thio compounds, are preferred. Nickel-tungsten catalysts such as $NiO$—$WO_3$ are especially valuable in view of their high desulfurizing activity.

Several hydrodesulfurization runs employing fluoride treated, cogelled alumina-silica supported catalysts were made to determine the improvements produced by our invention. Control runs were also made employing fluoride treated alumina, silica deposited on alumina (not cogelled) and silica-alumina (cracking type catalyst) supported hydrogenating catalysts. The control runs were made to form a basis for comparison and to determine more clearly the extent of improvement effected by the invention. In each run the charge employed was Kuwait crude, a high sulfur crude of 2.53 to 2.60 percent sulfur content and relatively low API gravity of 31.4 to 31.7. All runs were carried out on stationary catalyst beds with downflow of charge stock through the catalyst bed. The reaction conditions were in each instance approximately as follows:

Hydrogen:oil ratio _____ 5000 s.c.f./bbl.
Temperature _____ 850° F.
Pressure _____ 500 p.s.i.g.
Space velocity _____ 1 vol. charge/vol. cat./hr.
Throughput _____ 4 vol. charge/vol. cat./hr.

All catalysts treated were prepared by impregnating the carrier with a nickel-tungsten solution (1:1 mol ratio). In the runs involving fluoride treatment, the carriers were treated with aqueous HF to incorporate in the various carriers about 3 percent fluorine by weight, based on the weight of the carrier. In the runs involving calcining, the calcination was carried out at about 900° F. in the presence of air. The results of the first cycles are not given because they are not considered to be representative. In starting the first cycle temperatures are sometimes deliberately held down below standard operating conditions because of hot spots due to initial high activity of the catalyst. The results from the first cycle are usually neither consistently high nor consistently low. The results of these runs are presented in Table I.

The carrier employed in columns 1, 2 and 3 contained 94 percent alumina with 6 percent silica formed by coprecipitation from a solution of sodium aluminate and sodium silicate. The carrier shown in column 4 was a commercial activated alumina containing only small amounts or traces of impurities. The carrier mentioned in columns 5 and 6 was prepared by treating a sodium aluminate solution to form alumina. This alumina was impregnated with a sodium silicate solution, dried and washed with acid to remove alkali. The final product contained about 5 percent silica deposited on the alumina base. The carrier shown in columns 7 and 8 was a commercial cracking catalyst sold by Houdry Process Corporation and contained approximately 87 percent silica and 13 percent alumina (Houdry S–46).

*Table I*

| Base | Column 1 Alumina-Silica (Cogelled) | | Column 2 Alumina-Silica (Cogelled) | | Column 3 Alumina-Silica (Cogelled) | | Column 4 Alumina | | Column 5 Silica deposited on Alumina | | Column 6 Silica deposited on Alumina | | Column 7 Silica-Alumina | | Column 8 Silica-Alumina | |
| --- | --- | --- | --- | --- | --- | --- | --- | --- | --- | --- | --- | --- | --- | --- | --- | --- |
| Percent NiW (1:1) | 5 | | 5 | | 5 | | 5 | | 5.5 | | 5.7 | | 5 | | 5 | |
| HF treated | No | | Yes | | Yes | | Yes | | No | | Yes | | No | | Yes | |
| Oven-dried or calcined after HF treatment and before impregnation. | Oven-dried | | Oven-dried | | Calcined | | Oven-dried | | Oven-dried | | Oven-dried | | Oven-dried | | Oven-dried | |
| Calcined after impregnation. | Yes | | Yes | | Yes | | Yes | | Yes | | Yes | | Yes | | Yes | |
| | Percent S | °API | Percent S | °API | Percent S | °API | Percent S | °API | Percent S | °API | Percent S | °API | Percent S | °API | Percent S | °API |
| Product inspection, cycle: | | | | | | | | | | | | | | | | |
| II | 0.58 | 44.1 | 0.37 | 49.5 | 0.30 | 47.6 | 0.48 | 42.3 | 0.54 | 41.1 | 0.57 | 42.8 | 0.68 | 46.1 | 0.79 | 45.5 |
| III | 0.65 | 42.5 | 0.41 | 47.6 | ¹0.44 | ¹46.1 | 0.46 | 41.3 | 0.68 | 41.3 | 0.61 | 42.9 | 0.72 | ¹44.9 | 0.76 | 45.1 |
| IV | 0.76 | 43.0 | 0.37 | 46.2 | 0.26 | 48.1 | 0.46 | 41.0 | 0.66 | 41.8 | 0.60 | 42.4 | 0.77 | 45.3 | ¹0.86 | 45.0 |
| II-IV (average) | 0.66 | 43.2 | 0.38 | 47.8 | 0.28 | 47.9 | 0.47 | 41.5 | 0.63 | 41.4 | 0.59 | 42.7 | 0.72 | 45.7 | 0.78 | 45.1 |
| V | | | | | 0.30 | 50.2 | | | | | | | | | | |
| VI | | | | | 0.33 | 48.7 | | | | | | | | | | |
| VII | | | | | 0.27 | 50.7 | | | | | | | | | | |
| VIII | | | | | 0.27 | 48.3 | | | | | | | | | | |

¹ Determinations made but results not reliable. Not included in averages.

Comparison of the data presented in columns 1, 2 and 3 indicates that HF treatment of a cogelled carrier prior to impregnation with the hydrogenating component gives a catalyst which has a greatly increased hydrodesulfurization activity. Thus, in column 1 the desulfurization catalyst was not HF treated and lowered the sulfur only to 0.66%. However, as shown in column 2, the HF treatment of the catalyst resulted in reduction of the sulfur to 0.38 percent. Comparison of columns 2 and 3 shows that HF treatment followed by calcining prior to deposition of the hydrogenating component resulted in further improvement in the desulfurization activity of the catalyst. Also column 3 shows that this high desulfurization activity is retained over a prolonged period of time and after repeated regenerations. Comparison of columns 2 and 3 with column 4 brings out the fact that the presence of silica is important since HF treatment of a substantially pure alumina carrier does not result in nearly as high desulfurization activity.

Comparison of columns 2 and 3 with columns 5 and 6 shows that it is necessary to employ a cogelled alumina-silica carrier to obtain maximum results from HF treatment. Thus, in column 6 where the carrier was prepared by depositing about 5 percent silica upon preformed alumina the desulfurization activity as a result of HF treatment was not noticeably improved over column 5 where no HF treatment was employed.

A comparison of column 7 with column 8 shows that HF treatment of a high silica-low alumina carrier does not result in improved desulfurization activity. On the contrary, the HF treatment decreases the desulfurization activity. This is to be compared with columns 1, 2 and 3 wherein the data show that HF treatment of a high alumina-low silica cogelled catalyst results in a very marked increase in desulfurization activity.

While our invention is primarily directed to improvement of desulfurization activity of the catalyst, it will be noted from a comparison of column 1 with columns 2 and 3 that the degree of conversion to lower boiling hydrocarbons is markedly improved by the HF treatment of the cogelled carrier constituting the subject matter of the invention. It will also be noted that this improved specific activity is retained over a prolonged period of time as a result of calcining (column 3).

To sum up briefly the conclusions which may be drawn from the data, HF treated cogelled alumina-silica hydrogenating catalysts are unexpectedly improved in desulfurizing activity. Furthermore, HF treated cogelled alumina-silica supported hydrogenating catalysts show greater destructive hydrogenating activity than the similarly treated alumina-silica supported catalysts prepared by deposition, or alumina or silica-alumina supported catalysts. Calcining the HF treated cogelled alumina-silica supported catalysts before impregnation with the hydrogenating component further enhances the desulfurizing activity of the catalyst and in addition produces a catalyst more retentive of its activity.

The improved catalysts of our invention may be used to hydrodesulfurize sulfur containing hydrocarbons of any type. Thus, for instance, petroleum fractions such as gasoline may be hydrodesulfurized employing our improved catalysts. The invention is of particular value for the desulfurization of heavy stocks such as crude petroleums, reduced or topped crudes or heavy fractions. The invention is applicable to catalytic desulfurization in which the sulfur is converted to hydrogen sulfide or to contact desulfurization in which the sulfur is chemically combined with the metalliferous hydrogenating material to form a metallic sulfide. The processing period in this type of hydrodesulfurization is terminated prior to the appearance in the effluent of substantial amounts of hydrogen sulfide. The reaction conditions employed in these processes are well known and form no part of our invention. However, by way of example, the following typical conditions are suggested:

| | | |
|---|---|---|
| Temperature | °F | 600–1000 |
| Pressure | p.s.i.g | 300 to 3000 |
| Space velocity | | 0.2 to 6 |
| Hydrogen:oil ratio | s.c.f./bbl | 300–20,000 |

In the hydrodesulfurization of hydrocarbon oils the reactions are accompanied by the formation of a carbonaceous deposit on the catalyst, normally referred to as coke. Also in certain instances other contaminants such as sulfur may be combined with the catalyst. These contaminants necessitate periodic regeneration or revivification of the catalyst. This is carried out in a manner known to the art, e.g., by heating in the presence of oxygen containing gases. During this treatment the contaminants are burned off and removed in the form of flue gas. The conditions of regeneration are well known.

What we claim is:

1. A hydrodesulfurization catalyst having increased desulfurizing activity obtained by providing a cogelled carrier containing about 85 to 99 percent alumina, the balance being substantially all silica, treating the carrier with a corrosive compound of fluorine, drying, and depositing thereon a metalliferous hydrogenating catalyst.

2. The process for preparing a hydrodesulfurizing catalyst of increased desulfurizing activity comprising providing a cogelled carrier containing about 85 to 99 percent alumina, the balance being substantially all silica, treating the carrier with hydrogen fluoride, calcining and depositing nickel tungstate thereon.

3. A hydrodesulfurization catalyst having increased desulfurizing activity obtained by providing a cogelled carrier containing about 85 to 99 percent alumina, the balance being substantially all silica, treating the carrier with a corrosive compound of fluorine selected from the group consisting of HF, $NH_4F$, $NH_4F \cdot HF$, $H_2SiF_6$ and $HBF_4$, drying and depositing thereon a metalliferous hydrogenating catalyst.

4. The process for preparing a hydrodesulfurizing catalyst of increased desulfurizing activity comprising providing a cogelled carrier containing about 85 to 99 percent alumina, the balance being substantially all silica, treating the carrier with a corrosive compound of fluorine selected from the group consisting of HF, $NH_4F$, $NH_4F \cdot HF$, $H_2SiF_6$ and $HBF_4$, calcining and depositing thereon a metalliferous hydrogenating catalyst.

5. A hydrodesulfurizing catalyst of increased desulfurizing activity obtained by providing a cogelled carrier containing about 85 to 99 percent alumina, the balance being substantially all silica, treating the carrier with a corrosive compound of fluorine selected from the group consisting of HF, $NH_4F$, $NH_4F \cdot HF$, $H_2SiF_6$ and $HBF_4$, calcining and depositing thereon a metalliferous hydrogenating catalyst selected from the group consisting of iron, nickel, cobalt; oxides of iron, nickel and cobalt; chromates of iron, nickel and cobalt; molybdates of iron, nickel and cobalt; and tungstates of iron, nickel and cobalt.

6. A hydrodesulfurizing catalyst of increased desulfurizing activity obtained by providing a cogelled carrier containing about 85 to 99 percent alumina, the balance being substantially all silica, treating the carrier with a corrosive compound of fluorine, calcining and depositing thereon a metalliferous hydrogenating catalyst selected from the group consisting of iron, nickel, cobalt; oxides of iron, nickel and cobalt; chromates of iron, nickel and cobalt; molybdates of iron, nickel and cobalt; and tungstates of iron, nickel and cobalt.

References Cited in the file of this patent

UNITED STATES PATENTS

| | | |
|---|---|---|
| 2,322,622 | Fischer et al. | June 22, 1943 |
| 2,348,624 | Hillman | May 9, 1944 |
| 2,426,118 | Parker et al. | Aug. 19, 1947 |
| 2,478,916 | Haensel | Aug. 16, 1949 |
| 2,602,772 | Haensel | July 8, 1952 |
| 2,611,736 | Haensel | Sept. 23, 1952 |
| 2,753,310 | Riedl | July 3, 1956 |
| 2,760,907 | Attame et al. | Aug. 28, 1956 |